United States Patent Office 2,902,432
Patented Sept. 1, 1959

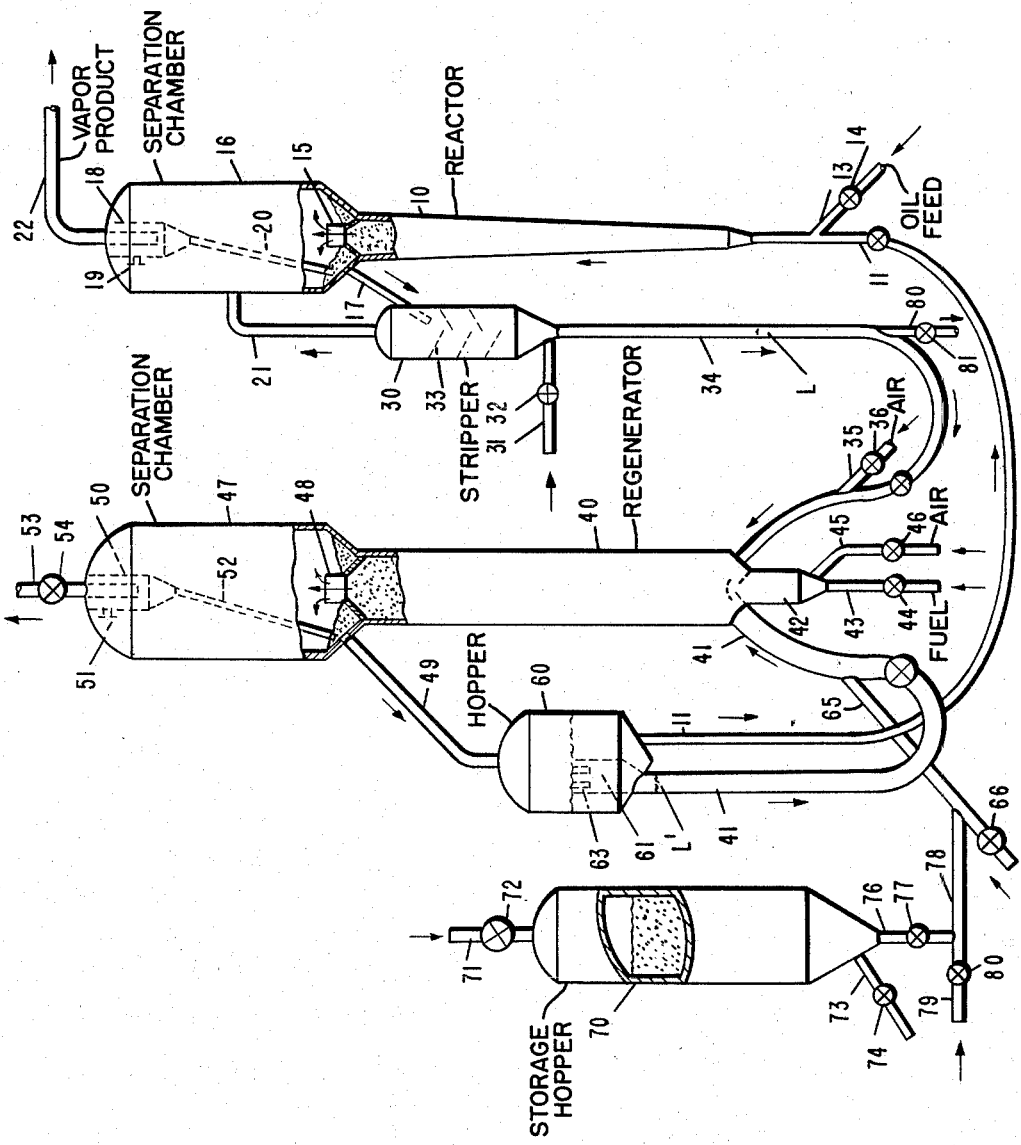

2,902,432
CATALYTIC CONVERSION OF HYDROCARBONS

Howard G. Codet, Westfield, Charles E. Jahnig, Red Bank, and Arnold F. Kaulakis, Chatham, N.J., assignors to Esso Research and Engineering Company, a corporation of Delaware Application February 9, 1954, Serial No. 409,178

4 Claims. (Cl. 208—113)

This invention relates to a method and apparatus for catalytically converting hydrocarbons to lower boiling products.

The catalytic cracking or conversion of hydrocarbons has been employed extensively for a number of years to upgrade certain fractions of crude oil to more desirable and valuable lower boiling products. This process has been predominantly utilized to produce high octane gasoline from high boiling hydrocarbon gas oils, but the process also produces other valuable products such as isobutane and light olefins which are suitable as raw materials for alkylation, polymerization, synthetic rubber manufacture, and other chemical synthesis processes. In general, in the catalytic cracking of hydrocarbons, a hydrocarbon gas oil is contacted with a cracking catalyst at elevated temperatures so as to crack the hydrocarbon molecules to produce lower boiling products. In the cracking step a certain amount of coke or carbon is formed which is deposited on the catalyst. The spent catalyst is regenerated by burning off these carbonaceous deposits and the regenerated catalyst is then employed to further crack more hydrocarbon gas oil.

Three different catalytic cracking processes are in use commercially at the present time. One of these processes is the fixed bed method in which the catalyst in the form of pills is arranged in a stationary bed. A hydrocarbon gas oil is passed through this fixed bed until the catalyst becomes inactivated by the deposits of coke. The gas oil feed is then discontinued and air is introduced to the fixed bed to burn off the carbonaceous deposits on the catalyst. After this regeneration step the fixed bed of regenerated catalyst is ready for another cracking step.

In another process, catalyst in the form of small granules or beads is continuously circulated back and forth between a reactor and a separate regenerator. The catalyst is contacted in the reactor with a hydrocarbon gas oil to form lower boiling products as well as coke which is deposited on the catalyst. The spent catalyst is passed to a separate regeneration zone wherein the catalyst is regenerated by contacting it with an oxygen containing gas to burn off the carbonaceous deposits from the catalyst. The regenerated catalyst is then passed back to the reactor for further cracking of additional gas oil. This process has the advantage of being a continuous process.

In still another continuous process, known as the fluid catalytic cracking process, a catalyst in the form of a powder is employed. This process exhibits several fundamental advantages over the previously-mentioned cracking processes such as simplicity, ease of control of feed rate, reactor temperature and catalyst activity, in addition to better utilization of heat from the regeneration step. A catalyst having a size range of about 0–200 microns, with substantially all of the catalyst being about 20–100 microns, is employed. This finely divided catalyst when aerated by means of a gasiform material acts very much like a liquid so that it may easily be handled. This finely divided catalyst is contacted with a hydrocarbon gas oil and the mixture at a temperature of about 850–1000° F. is introduced into the bottom of a reactor wherein the gas oil is converted to lower boiling products as well as coke which is deposited on the catalyst in a manner similar to the other catalytic cracking processes. The hydrocarbon gas oil which is in the vapor form in the reactor is passed upwards in the reactor at a superficial velocity of about 1–3 feet/second to thereby fluidize the catalyst in the reactor. The catalyst forms a dense fluidized bed in the bottom of the reactor through which the vaporous hydrocarbons pass. Above the dense fluid bed of catalyst in the reactor is a disperse phase comprising the rising vaporous converted hydrocarbons and some entrained catalyst. The hydrocarbons vapors are separated from the entrained catalyst by means of cyclone separators, etc., and are then passed to recovery equipment wherein the vaporous lower boiling converted products are recovered and separated into desired fractions. A certain amount of the finely divided catalyst in the dense fluid bed of the reactor is continuously withdrawn and passed to a regenerator wherein the catalyst is combined with an oxygen-containing gas to burn off the carbonaceous deposits from the catalyst. The oxygen-containing gas, which is normally air, is passed upwardly at a superficial velocity of about 1–3 ft./sec., in the regenerator through the finely divided catalyst which, as in the reactor, is in the form of a dense fluidized bed arranged in the bottom portion of the regenerator. The flue gases formed from the oxidation reaction in the regenerator pass up from the dense fluid bed into a disperse phase above the dense fluid bed. The small amount of catalyst which is entrained in the flue gas in the disperse phase is separated from the flue gases leaving the upper portion on the regenerator and is returned to the dense fluid bed in the regenerator. A certain amount of the catalyst in the regenerator is continuously passed back to the reactor for further cracking of additional gas oil.

Although most of the finely divided catalyst is separated from the vaporous lower boiling converted hydrocarbons leaving the top of the reactor and the flue gases leaving the top of the regenerator and then returned to the system, some of the finely divided catalyst is lost to the atmosphere. This lost catalyst is replaced by the addition of fresh catalyst to the catalytic cracking system. In addition to the fresh catalyst which is added to the system to replace losses, more fresh catalyst may be added to the system to maintain the activity and selectivity of the inventory of catalyst in the system. When this is done, an amount of catalyst is intentionally withdrawn from the system equivalent to the amount added in excess of the amount required to replace losses. This additional catalyst added to the system in excess of that required to replace losses is normally required to maintain the effectiveness of the catalyst. This is because after catalyst particles have been employed in the cracking-regeneration cycle for some time, their activity and selectivity is substantially decreased. The high temperature and steam partial pressures involved in the cracking and regeneration steps cause the catalyst to decrease in surface area. Also the catalyst becomes contaminated with such metals as iron, nickel, vanadium, sodium, etc., which are introduced into the system in the gas oil. These metal contaminants substantially reduce the effectiveness or selectivity of the catalyst and thereby cause a poor distribution of converted products by producing an undesirably large deposition of coke on the catalyst, a high proportion of gas ($C_3$ and lighter material), and an appreciably lower yield of gasoline. The undesirable effect of these metal contaminants is exaggerated as the surface area of the catalyst is decreased.

Thus to maintain the effectiveness of the inventory of catalyst in the system, fresh catalyst is normally added either continuously or periodically in excess of catalyst losses to improve the selectivity and activity of the catalyst in the system.

However, because commercial catalysts are relatively expensive there is an economic limit as to how much catalyst may be added. This is determined by an economic balance of the cost of catalyst addition versus the value of the improved yields to be realized by the addition of the fresh catalyst. Thus any improvement which decreases the amount of fresh catalyst required to be added to maintain a particular catalyst effectiveness, or any improvement which increases the value of the converted hydrocarbon products for a particular catalyst addition rate, would be highly advantageous. The present invention is designed to produce these desired results.

It is an object of the present invention to provide a method and means for improving the distribution of converted products from the catalytic cracking of hydrocarbons by improving the effectiveness of the catalyst for a given catalyst addition rate to the system.

It is a further object of the present invention to provide a method and means for reducing the amount of fresh catalyst required to be added to a catalytic cracking system to maintain a given distribution of converted products.

These and other objects will be apparent from a reading of this specification in which the present invention is described in detail. Briefly the present invention comprises contacting hot finely divided catalyst, having a size range of about 0–200 microns, with a hydrocarbon gas oil substantially all of which boils between 430 and 1100° F., passing the resultant mixture of finely divided catalyst and vaporous hydrocarbons upwardly substantially concurrently in a high velocity conversion zone at a superficial velocity of at least about 6.0 feet/second, separating the resultant converted hydrocarbons from the finely divided catalyst on which coke is deposited, recovering the hydrocarbon products, combining the resultant spent catalyst with air, passing the resultant mixture substantially concurrently upwards in a high velocity regeneration zone at a superficial gas velocity of at least about 6.0 feet/second to burn off the carbonaceous deposits on the finely divided catalyst, recycling a major portion of the hot regenerated catalyst back to the regeneration zone together with additional oxygen-containing gas, and passing the remainder of the hot regenerated catalyst back to the conversion zone for contact with additional fresh hydrocarbon gas oil.

Under the operating conditions of the present invention, a relatively low inventory of catalyst is required in the catalytic cracking system for a given percent of conversion and a given gas oil feed rate to the system as compared to conventional fluid catalytic cracking systems wherein the catalyst is maintained in the regenerator and reactor in the form of a dense fluidized bed. This low catalyst inventory is due in part to the more effective contacting of catalyst with oil in the reactor and with air in the regenerator and in part to having a more active catalyst. Both of these in turn are due to the operating conditions and the apparatus of the present invention. More specifically the relatively high superficial velocity employed in the conversion zone of the present invention prevents the partially cracked products from circulating downwards in the conversion zone wherein they would be further cracked to undesirable gas and coke as would be the case in the conventional dense fluid bed type of cracking system. In addition, because the flow of catalyst and hydrocarbons is substantially concurrent in the conversion zone, the cracking reaction is more effective and thus requires less catalyst holdup or inventory for a given conversion level. Also the relatively high superficial velocity employed in the regeneration zone produces a concurrent flow of catalyst and air so that as a result the carbon burning rate is substantially increased which in turn permits a substantially lower catalyst holdup to be employed in the regenerator as compared to conventional dense fluid bed regenerators. This higher burning rate is due mainly to the effect of the substantially concurrent flow in the regenerator which produces an appreciably higher average oxygen content in the regenerator than in conventional systems. An oxygen gradient is set up in the regenerator such that at the lower inlet to the regenerator the oxygen content of the oxygen-containing gas is relatively high. Thus in operating a regenerator to a given oxygen content in the exit flue gas, the average oxygen content in the regenerator is substantially greater than in the dense fluid bed system wherein the average oxygen content in the fluid dense bed is essentially the same as in the flue gas leaving the regenerator.

For the aforementioned reasons, the catalytic cracking system of the present invention requires a lower catalyst holdup or inventory than does a conventional dense fluid bed type of cracking system for a given gas oil capacity. Because of the lower catalyst inventory required in the present invention, it is possible to maintain the effectiveness of the catalyst at a higher level for a given rate of fresh catalyst addition to the system. It has been found that metal contaminants such as iron, nickel, vanadium, sodium, etc., have a more adverse effect on catalyst selectivity where the catalyst has a lower surface area. It has been previously mentioned that the surface area of the catalyst decreases as the catalyst is employed in the cracking-conversion cycle. Thus for a given rate of catalyst addition per barrel of gas oil feed to the cracking system, it is possible to maintain the surface area of the catalyst higher when the catalyst inventory is smaller and because of this it is then possible to obtain better catalyst selectivity due to the decreased adverse effect of metal contaminants on catalyst having a higher surface area. Therefore, for a given conversion level, it is possible to produce a lower carbon yield, a lower gas yield, and a greater yield of gasoline. Alternatively, one may reduce the rate of fresh catalyst addition to the system while still maintaining a given product distribution and thus save on the cost involved in adding fresh catalyst to the system.

The present invention will be best understood by reference to the drawing which is partly a front elevation showing apparatus adapted for carrying out the method of the present invention. The apparatus is shown in cross section to facilitate the disclosure.

Referring now to the drawing, reference character 10 designates a reaction vessel or reactor adapted to convert hydrocarbons to lower boiling products. Reactor 10 is a slender vertically-arranged vessel preferably having a circular horizontal cross section. Reactor 10 may be termed a transfer line reactor. Because the hydrocarbon vapors expand somewhat in volume as cracking proceeds, reactor 10 is tapered having a smaller diameter at the bottom than at the top. Hot, freshly regenerated catalyst is introduced to the bottom of reactor 10 through conduit 11, which as shown in the drawing is a U-shaped tube designed and operated as described in U.S. Patent No. 2,589,124. It is to be understood, however, that any other conventional apparatus for transferring a finely divided solid from one vessel to another may be employed in this invention.

The catalyst is finely divided and has a size range of about 0–200 microns with substantially all of the catalyst having a size range of 20–100 microns. The catalytic material may be natural clay, synthetic silica-alumina, silica-magnesia, boria-alumina, etc. The temperature of the hot freshly regenerated catalyst will be about 1000–1200° F., and a portion of its sensible heat is utilized to vaporize a hydrocarbon gas oil introduced into conduit 11 through conduit 13. The hydrocarbon gas oil may be preheated by a preheat furnace (not shown) to a temperature as high as about 800° F., if desired. The rate of introduction of the hydrocarbon gas oil into the bottom of reactor 10 is controlled by valve 14 in conduit 13. The mixture of the regenerated catalyst and the vaporous hydrocarbon gas oil is passed upwardly through reactor 10 wherein the average pressure is about 10–25 p.s.i.g. and the average temperature is about 850–1000° F. Because the catalytic cracking reaction is endothermic, it is necessary to introduce the catalyst gas oil mixture at a temperature above the average reactor temperature. For this reason the temperature at the top of reactor 10 in this invention will be lower than at the bottom since the flow of catalyst and oil is substantially concurrent with essentially no downward circulation. Normally, a temperature gradient of 25–75° F., will exist across reactor 10. The vaporous hydrocarbon vapors are passed upwardly through reactor 10 at a superficial velocity of about 6–14 feet/second, and preferably about 8–12 feet/second in accordance with the present invention. If superficial velocities in excess of about 14 feet/second are employed, the density of the catalyst-oil mixture would decrease to a point where holdup would be insufficient to get the cracking required. On the other hand if superficial velocities below about 6 feet/second are employed, the advantages to be gained by employing high velocity vessels would be substantially lost since the conditions of the conventional dense fluid bed vessels would be approached. In passing through reactor 10 the vaporous hydrocarbon gas oil is cracked or converted to lower boiling vaporous products resulting in an increase in volume. To maintain the superficial velocity of the hydrocarbon vapors relatively uniform in the conversion zone, reactor 10 is enlarged in cross section relatively uniformly from bottom to top. During the conversion reaction coke or carbon is formed which is laid down on the surface of the finely divided catalyst as a carbonaceous deposit to form spent catalyst.

The ratio of catalyst/oil, on a weight basis, in this invention is about 4 to 8 and preferably about 5 to 6. When operating at these superficial velocities and catalyst/oil ratios and when utilizing a finely divided catalyst having a size range of about 0–200 microns, the density of the catalyst-hydrocarbon vapor mixture in reactor 10 will be less than about 15 lbs./ft.$^3$ and preferably about 5–10 lbs./ft.$^3$. The w./hr/w. (weight of hydrocarbon gas oil/hour/weight of catalyst holdup in reactor 10) will be about 15–25 under these conditions and the percent conversion (100 percent of products from the conversion zone boiling above 430° F.) will be about 50–65%.

At the upper end of the conversion zone the spent catalyst, which is inactivated by the carbonaceous deposits, and the lower boiling vaporous hydrocarbon products flow upwards from the top of reactor 10 into enlarged separation chamber 16 through rough cut cyclone 15. Rough cut cyclone 15 comprises a hollow cylindrical housing which has its longitudinal axis aligned vertically, and a plurality of radial turning vanes which are arranged within the housing so as to cause the catalyst-hydrocarbon vapor mixture to be swirled around therein as the mixture passes from reactor 10 to separation chamber 16. The catalyst particles are separated from the hydrocarbon vapors by centrifugal force resulting from the swirling action caused by cyclone 15 and they are thrown tangentially outwards into the lower portion of separation chamber 16 after passing through the upper opening of the housing of cyclone 15. Separation chamber 16 is arranged above reactor 10 and may be larger in diameter than reactor 10 if desired, as shown in the drawing, in order to reduce the superficial velocity of the hydrocarbon vapors therein to thereby increase the effectiveness of separation of catalyst particles from vapors. The major portion of the catalyst is separated from the hydrocarbon vapors by cyclone 15 and the separated catalyst is removed from separation chamber 16 by means of conduit 17 which communicates with the bottom thereof. An aerating gas such as steam may be introduced into the bottom of separation chamber 16, if necessary to maintain the catalyst therein in a fluidized condition. A disperse phase of hydrocarbon vapors and a small amount of entrained catalyst rises upwards in separation chamber 16 at a superficial velocity of less than about 3 feet/second and passes into cyclone separator 18 through inlet 19. Cyclone separator 18 separates essentially all of the entrained catalyst from the converted hydrocarbon vapors and the separated catalyst is returned to the bottom of chamber 16 by means of leg 20. This separated catalyst also is removed from chamber 16 by means of conduit 17. The vaporous hydrocarbon products leave cyclone separator 18 through outlet conduit 22 and pass therethrough to recovery equipment for recovery and for separation of the converted products into various desired fractions.

The separated spent catalyst from separation chamber 16 flows downward through conduit 17 and passes into the upper portion of disperse phase stripper 30. A stripping gas such as steam is introduced into the bottom of stripper 30 through inlet conduit 31. The rate of introduction of the stripping gas is controlled by means of valve 32 in conduit 31. About 2–4 lbs. of steam/1000 lbs. of catalyst is normally employed. The stripping steam rises upwardly at a superficial velocity of about 1 foot/second in stripper 30 past baffles 33 which are arranged therein. The spent catalyst entering the upper portion of stripper 30 falls freely downwardly countercurrent to the rising steam at a rate of about 500–700 lbs./minute/ft.$^2$ of stripper cross-sectional area and cascades over baffles 33 to thereby strip any entrained hydrocarbons from the spent catalyst. The stripping steam and stripped hydrocarbons pass upwards in stripper 30 and pass from stripper 30 to separation chamber 16 through conduit 21. The stripped hydrocarbons thereafter pass through cyclone separator 18 and conduit 22 to the hydrocarbon recovery equipment.

The stripped spent catalyst flows out of the bottom of stripper 30 and passes downward into conduit 34. Conduit 34 which is a U-shaped tube designed as described in U.S. Patent No. 2,589,124 communicates at its other end with the bottom of regenerator 40. An aeration gas which is normally air is introduced into conduit 34 by means of conduit 35 and its rate of introduction is controlled by means of valve 36 in conduit 35.

The flow of catalyst into regenerator 40 is controlled by means of the amount of air introduced into conduit 34 through conduit 35. The rate of removal of spent catalyst from stripper 30 and conduit 34 for passage to regenerator 40 is adjusted so as to maintain a disperse phase of catalyst in stripper 30 in order to minimize the holdup of catalyst in stripper 30. The lower level of this disperse phase in conduit 34 is indicated by the reference character L. Level L is thus controlled by means of the aeration gas introduced into conduit 34 through conduit 35, which is maintained at a higher elevation than the point where conduit 35 connects to conduit 34.

Besides the spent catalyst introduced into the bottom of regenerator 40 through conduit 34, a major portion of the hot regenerated catalyst from regenerator 40 is also introduced to the bottom of regenerator 40 through conduit 41 as will be hereinafter described in greater detail. Regenerator 40, like reactor 10, is a slender vertically-arranged vessel preferably having a circular cross section and preferably being about the same height as reactor 10. Regenerator 40 may be termed a transfer line regenerator.

Arranged exteriorly to the bottom of regenerator 40 is auxiliary burner 42 which communicates at its upper end with the bottom of regenerator 40. Burner 42 is normally employed only during the startup of the catalytic cracking system to provide the initial heat necessary to place the system in operation. During startup, a fuel is introduced to burner 42 through line 43 and its rate of introduction to burner 42 is controlled by means of valve 44 in line 43. An oxygen-containing gas which is normally air is supplied to burner 42 by means of line 45 and its rate of introduction to burner 42 is controlled by means of valve 46 in line 45. The burning of this fuel may be continued during the normal operation of regenerator 40 to supply additional heat thereto, if desired, but, usually during the normal operation of regenerator 40, valve 43 is closed so that fuel is not introduced into burner 42. However, the flow of air through line 45 is continued during normal operation since the major portion of air required for the operation of regenerator 40 is supplied by this means. Thus, air passes from line 45 through the interior of burner 42 into the bottom of regenerator 40.

The mixture of finely divided catalyst and air is passed upwardly in regenerator 40 at a superficial gas velocity of about 6–14 feet/second, and preferably at a superficial gas velocity of about 8–12 feet/second. Because the regeneration reaction is exothermic, the temperature at the top of regenerator 40 will be higher than at the bottom. The average regenerator temperature will be about 1000–1200° F. with the temperature gradient from bottom to top being about 50–100° F. The average pressure in regenerator 40, which is lower than in reactor 10, will be about 5–15 p.s.i.g. and the density of the catalyst-air mixture will be less than about 15 lbs./ft.$^3$, and preferably about 6–10 lbs./ft.$^3$. The introduction of air and catalyst is adjusted to effect a carbon burning rate of about 40–50 lbs. of carbon/hour/pound of carbon inventory or hold-up in regenerator 40 when operating to a regenerated catalyst carbon content of about 0.5 wt. percent and a flue gas oxygen content of about 1.0 mol percent.

The flow of air and catalyst up through regenerator 40 is essentially concurrent. Appreciably higher catalyst regeneration rates are effected when operating under the conditions in accordance with this invention as compared to the conventional dense bed type of regeneration process. This is chiefly because of the appreciable oxygen gradient which exists in regenerator 40, although the higher velocity and improved catalyst quality of the present invention contribute somewhat to the higher carbon burning rate. When operating to 2.0% oxygen content, for example, in the outlet flue gas, the average oxygen concentration in regenerator 40 is 8.1% which is about four times higher than in a conventional dense fluid bed type of regenerator also operating to 2.0% oxygen content in the outlet flue gas because the oxygen content of the conventional dense fluid bed is necessarily substantially the same as the oxygen content of the outlet flue gases. Because of the substantially higher carbon burning rate effected in regenerator 40, as compared to conventional regenerators, it is possible to substantially reduce the catalyst hold-up or inventory in the regeneration apparatus.

The hot regenerated catalyst and flue gases formed in the combustion reaction in regenerator 40 pass out of the top of regenerator 40 into separation chamber 47 which is arranged above regenerator 40. The catalyst mixture in passing from regenerator 40 to separation chamber 47 passes through rough cut cyclone 48 which is similar in design to cyclone 15 above reactor 10. The major portion of the catalyst in the catalyst-flue gas mixture is separated from the flue gases and is thrown tangentially outwards into the bottom portion of separation chamber 47 from which the catalyst is withdrawn by means of conduit 49. An aerating gas such as air may be introduced into the bottom of separation chamber 47, if necessary, to maintain the catalyst therein in a fluidized condition. The flue gases which contain a small amount of entrained catalyst pass upwards in enlarged separation chamber 47 at a superficial velocity of less than about 3 feet/second and enter cyclone separator 50 through inlet 51. The entrained catalyst particles are separated from the flue gases and are returned to the bottom portion of separation chamber 47 by means of leg 52. The hot flue gases leave the upper part of separation chamber 47 and cyclone separator 50 through outlet conduit 53 which contains valve 54, which may be operated to control the pressure in separation chamber 47. The hot flue gases or gaseous products of combustion may be discharged directly to the atmosphere or may be passed through heat exchange equipment first to recover a substantial portion of their sensible heat. If desired, a series of cyclone separators may be substituted for cyclone separator 50 to increase the effectiveness of separation of catalyst from the flue gases. Also if desired the cyclone separator or separators may be arranged exteriorly to separation chamber 47. A similar arrangement may be employed if desired in the case of separation chamber 16 arranged above reactor 10.

The hot regenerated catalyst is removed from separation chamber 47 by means of conduit 49. The hot regenerated catalyst freely falls due to the force of gravity down through conduit 49 and passes into hopper 60. Extending up through the bottom of hopper 60 is well 61 which communicates at its lower end with conduit 41. Well 61 is of a larger diameter than conduit 41 but of a substantially smaller diameter than hopper 60 and is arranged off-center of hopper 60 near the wall of hopper 60 so as not to lie directly underneath the inlet of conduit 49 into hopper 60. The upper section of well 61 is preferably cylindrical in form and is open at its upper end which is arranged intermediate the upper and lower ends of hopper 60. Slots 63 are spaced in the upper portion of the cylindrical section of well 61 to facilitate the removal of catalyst from hopper 60. Conduit 11 communicates with the bottom portion of hopper 60 and serves to withdraw a portion of the hot regenerated catalyst from hopper 60 for passage to reactor 10. The catalyst in excess of that withdrawn for passage to reactor 10 overflows into well 61 through slots 63 and flows downward into conduit 41 which is a U-shaped tube designed as described in U.S. Patent No. 2,589,124. The flow of catalyst through conduit 41 is controlled by the amount of aeration gas introduced therein through conduit 65, and the rate of introduction of this aeration gas through conduit 65 is controlled by means of valve 66. Catalyst is maintained at level L' in conduit 41 by regulating the amount of aeration gas introduced into conduit 41 through conduit 65. It is to be understood in this connection that any other conventional apparatus for transferring a finely divided solid from one vessel to another may be employed in this invention in lieu of conduit 41, as well as in lieu of conduit 34 previously described. In passing a certain amount of catalyst back to regenerator 40 a minor amount of coke or carbon may be burned off this recycled catalyst. However, the primary reason for recycling a portion of the regenerated catalyst back to regenerator 40 is to maintain the temperature at the inlet of regenerator 40 at the desired level so as to maintain a high average burning temperature by taking advantage of the high heat content of the recycled catalyst. A recycle rate of about 1/1 to 4/1 ratio of recycle catalyst/spent catalyst and preferably about 3/1 is necessary to accomplish this. Thus, at least about 50% of the separated regenerated catalyst is recycled to regenerator 40.

Reference character 70 designates a fresh catalyst storage hopper. Fresh catalyst is introduced to hopper 70 by means of inlet conduit 71 having valve 72. When fresh catalyst is to be added to the catalytic cracking system an aeration gas, such as air, is introduced to the bottom portion of hopper 70 through line 73 and the rate of introduction of the aeration gas is controlled by means of valve 74. The aeration gas causes the catalyst to be fluidized so that it will readily flow from hopper 70. Valve 77 in line 76 is opened to permit the fresh catalyst to flow downwardly through line 76 into conduit 78. Air introduced into conduit 78 through line 79 and controlled by valve 80 in line 79 causes the fresh catalyst to flow through conduit 78 and pass into conduit 65 and eventually into regenerator 40 through conduit 41. Fresh catalyst may be added continuously or intermittently depending upon the operating conditions of the catalytic cracking system.

Normally there is a small amount of catalyst lost from a catalytic cracking system which escapes from the system mainly with the flue gases leaving the regenerator. In certain cases, only an amount of fresh catalyst equal to the losses will be added to the catalytic cracking system. However, normally it is desirable to add additional fresh catalyst in excess of that required to replace losses in order to maintain the catalytic effectiveness of the catalyst inventory in the cracking system. After a catalyst has been used for some time in the system, wherein it has been subjected to high temperatures for a long period of time, the surface area of the catalyst particles decreases which results in poorer activity and selectivity of the catalyst in the cracking process. In addition the catalyst becomes contaminated with certain undesirable metals such as iron, vanadium, nickel, sodium, etc., which also adversely affect the activity and selectivity of the catalyst. Besides the normal undesirable effect of these metal contaminants on cracking, it has been found that these metal contaminants have an even greater undesirable effect on catalyst which has a low surface area. To maintain the catalyst inventory, then, at a desirable activity and selectivity a certain amount of fresh catalyst is normally added in excess of that required to replace losses and a similar amount is withdrawn intentionally from the cracking system. This catalyst may be withdrawn from the system of the present invention from conduit 34 by means of line 80 by opening valve 81 in line 80.

The present invention provides a method and means for minimizing the catalyst inventory required in a catalytic cracking system for a given level of conversion and for a given oil feed rate to the system. In fact only about one-fourth as much catalyst holdup or inventory will be required in the present invention as compared to the conventional dense fluid bed catalytic cracking system. The low catalyst inventory of the present invention makes it possible to maintain the surface area of the catalyst in the system at a high value because the inventory is replaced faster than in conventional systems when adding a fixed amount of fresh catalyst per barrel of gas oil feed. As a result of maintaining the surface area of the catalyst at a high value there is the resultant advantage of improved catalyst selectivity due to the decreased undesirable effect of metal contaminants on the high surface area catalyst. This improved catalyst selectivity results in a decreased carbon and gas yield and an increased gasoline yield from the catalytic cracking process.

The following example is given in order to set forth the present invention in greater detail but it is to be understood that the present invention is not limited to the specific values set forth herein. A hydrocarbon gas oil, preheated to a temperature of about 675° F., is introduced through conduit 13 into conduit 11 at the rate of 12,000 barrels/day. This hydrocarbon gas oil has a boiling range of 620° to 1050° F., and an API gravity of 22. Freshly regenerated catalyst at a temperature of about 1150° F., is contacted with the hydrocarbon gas oil in conduit 11 at the rate of 7.0 tons/minute and the resultant mixture is introduced into the bottom of reactor 10. The catalyst is a 12% silica-88% alumina catalyst having a size range of 20 to 100 microns and an original surface area when fresh of about 550 meters$^2$/gram. The average temperature in reactor 10 is about 925° F., and the average pressure is about 12.0 p.s.i.g. The pressure at the bottom of reactor 10 is about 13.1 p.s.i.g. and at the top of reactor 10 is about 11.0 p.s.i.g. The superficial velocity of the hydrocarbon vapors in reactor 10 is maintained at about 10.0 feet/second and the density of the catalyst-hydrocarbon mixture averages about 5.8 lbs./ft.$^3$. Under these operating conditions the catalyst/oil ratio will be about 5.6 and the w./hr./w. will be about 21.4 so that the catalyst holdup or inventory in reactor 10 will be about 3.4 tons. The height of reactor 10 is about 55 feet and the internal diameter is about 5.5 feet. About 55% by volume of the fresh gas oil feed is converted to hydrocarbons boiling below 430° F. and coke which is deposited on the catalyst. About 4% by weight of the fresh feed is converted to coke which represents about 1.22% carbon on the spent catalyst.

The resultant mixture of spent catalyst and converted lower boiling hydrocarbon vapors is then passed from reactor 10 through cyclone 15 into separation chamber 16 wherein the superficial velocity of the vapors is reduced to about 2.0 feet/second and the pressure is reduced to about 10.0 p.s.i.g. Separation chamber 16 is about 12 feet in diameter and about 23 feet high. About 7.0 tons/minute of catalyst are separated from the hydrocarbon vapors by cyclones 15 and 18 and the separated catalyst passes downwards from separation chamber 16 through conduit 17 and falls freely into stripper 30.

About 3.0 lbs. of steam/1000 lb. of catalyst, or in this example, about 2,520 lbs. per hour of steam are introduced to the bottom of stripper 30 through conduit 31. The stripping steam and stripped hydrocarbon vapors pass upwards through stripper 30 at a superficial velocity of about 1.0 feet/second and pass therefrom through conduit 21 to separation chamber 16. The catalyst passes through stripper 30 at a rate of about 610 lbs./min./ft.$^2$ of cross-sectional area of stripper 30. Stripper 30 is about 5.5 feet in diameter and about 24 feet high.

About 7.0 tons/min. of stripped spent catalyst are passed from stripper 30 to the bottom of regenerator 40 through conduit 34. An additional 21.0 tons/min. of regenerated catalyst are also introduced to the bottom of regenerator 40 by means of conduit 41. The two catalyst streams are combined with a total of about 16,700 standard cubic feet/minute of air entering regenerator 40 through conduits 34 and 41 and burner 42 by means of conduits 35 and 65, and line 45, respectively. At the bottom of regenerator 40 the temperature is about 1090° F., and the pressure is about 11.1 p.s.i.g. The average temperature in regenerator 40 is about 1120° F., and the average pressure is about 9.5 p.s.i.g. At the top of regenerator 40 the temperature is about 1150° F., and the pressure is about 8.2 p.s.i.g. The superficial gas velocity up through regenerator 40 is about 10.0 feet/second and the average density in the regenerator is about 7.7 lbs./ft.$^3$. When operating under these conditions so that the flue gases from the regenerator contain 1.0 mol percent oxygen and the regenerated catalyst passing to reactor 10 contains about 0.5% carbon, about 44.0 lbs. of carbon/hour/lb. of carbon holdup or inventory in regenerator 40 will be burned, which in this example is a total of about 6,000 lbs., of carbon/hour. Under these operating conditions the catalyst holdup or inventory in regenerator 40 will be about 11.6 tons. Regenerator 40 is about 8.5 feet in diameter and 54 feet high.

The mixture of flue gases and catalyst passes from regenerator 40 through cyclone 48 into separation chamber 47 wherein substantially all of the catalyst is separated from the flue gases by means of cyclones 48 and 50. The superficial velocity of the flue gases in separation chamber 47 is about 2.5 feet/second and the pressure is about 7.2 p.s.i.g. Separation chamber 47 is about 17 feet in diameter and 35 feet high. About 28 tons/min. of separated regenerated catalyst pass from separation chamber 47 through conduit 49 to catalyst hopper 60. The cylindrical section of hopper 60 is about 8 feet in diameter and the overall hopper height is about 12 feet. About 7.0 tons/min. of catalyst which contains about 0.5% carbon are withdrawn from the bottom of hopper 60 by means of conduit 11 and are passed to reactor 10. The remaining 21.0 tons/min. of catalyst overflow into well 61 and fall into conduit 41 and are recycled back to the bottom of regenerator 40.

In addition to the catalyst inventories of 3.4 and 11.6 tons in reactor 10 and regenerator 40, respectively, an additional 15 tons are held up in hopper 60 and other conduits in the system so that the entire system contains an inventory of about 30 tons of catalyst. About 0.6 lb. of fresh catalyst/barrel of gas oil feed are withdrawn from hopper 70 and passed through line 76 and conduits 78, 65, and 41 to the catalytic cracking system of the present invention. Thus about 3.6 tons/day of fresh catalyst are added to the system and this represents about 12% of the total inventory of catalyst in the system.

The following comparison is made between the above specific example of the present invention and a conventional dense fluid bed catalytic cracking system in order to illustrate the advantages of the present invention:

| Operating Conditions | Conventional Dense Fluid Bed System | Present Invention |
| --- | --- | --- |
| Gas Oil Feed Rate, Bbl./day | 12,000 | 12,000 |
| Catalyst Inventory, Tons | 120.0 | 30.0 |
| Fresh Catalyst Addition: | | |
|   Lbs./bbl. gas oil | 0.6 | 0.6 |
|   Tons/day | 3.6 | 3.6 |
|   Percent Inv./day | 3.0 | 12.0 |
| Superficial Velocity, ft./sec. | 2.5 | 10.0 |
| Percent $O_2$ in exit flue gas | 2.0 | 1.0 |
| Lbs. carbon burned/hour/lb. carbon holdup in regenerator | 16.0 | 44.0 |
| Catalyst Quality: | | |
|   Surface area, Meters$^2$/gram | 120 | 200 |
|   D+L Activity, Vol. Percent | 28.1 | 38.6 |
|   CTC Activity, Vol. Percent | 30.7 | 40.5 |
| Hydrocarbon Yields: | | |
|   Carbon, Wt. Percent | 4.67 | 4.00 |
|   Dry gas, Wt. Percent | 8.00 | 7.35 |
|   Hydrogen in coke, Wt. Percent | 0.47 | 0.40 |
|   Total Coke and Dry Gas, Wt. Percent | 13.14 | 11.75 |
|   Conversion, Vol. Percent | 55.0 | 55.0 |

The values indicated under catalyst quality are for the inventory of catalyst in the systems. It is to be clearly understood that the quality of the fresh catalyst added to both systems is identical, being of the same material and having the same size range, surface area, etc. It will be noted that the D+L and CTC activities, which are measures of catalyst effectiveness, indicate that the activity of the catalyst inventory of the present invention is substantially higher than in the conventional process. Also it will be noted that the surface area of the catalyst inventory in the present invention is substantially higher. This is due to the lower catalyst inventory required in the present invention for a given oil feed rate, which in turn is due to the better contacting in the reactor and regenerator obtained by the present invention. Thus for a given catalyst replacement rate in terms of tons/day, it is possible to maintain the quality of the catalyst in the present system at a more desirable level than in the conventional dense fluid bed process.

It will also be noted that for a given level of conversion, the present invention produces less dry gas and coke. This lower dry gas and coke yield is reflected in a higher $C_4$–430° F. gasoline yield of 1.74% by volume. The better product distribution of the present invention is due to the higher quality catalyst inventory resulting from the present invention. It is to be understood of course that the advantage gained from the present invention may be taken in another way, namely, to reduce the amount of fresh catalyst addition. Thus the value of the present invention may be realized as either an improved product distribution or a saving in fresh catalyst addition, or a combination of these two advantages.

What is claimed is:

1. A method for converting a hydrocarbon gas oil to lower boiling products which comprises combining said hydrocarbon gas oil with a hot finely divided catalyst having a size range of about 0–0200 microns in the proportions of about 4–8 lbs. of catalyst/lb. of oil to completely vaporize said hydrocarbon gas oil, passing the resultant mixture concurrently upwards at a superficial velocity of about 6–14 feet/second through a conversion zone wherein the weight of said hydrocarbon gas oil passing through said conversion zone/hour/weight of catalyst holdup in said conversion zone is maintained at about 15–25 and wherein the vaporous hydrocarbon gas oil is converted to vaporous lower boiling products and a small amount of coke which is deposited on said catalyst to form spent catalyst, separating the vaporous lower boiling converted products from said spent catalyst, recovering the separated vaporous lower boiling converted products, mixing the separated spent catalyst with air and introducing the resultant mixture into the bottom portion of a regeneration zone, passing the resultant mixture concurrently upwards at a superficial velocity of about 6–14 feet/second through said regeneration zone wherein the density of said mixture is maintained at less than about 15 lbs./ft.$^3$ and wherein a major portion of said coke is burned off said spent catalyst to produce hot regenerated catalyst and gaseous combustion products having a low oxygen content, separating said hot regenerated catalyst from said gaseous combustion products, recycling at least about 50% of the separated hot regenerated catalyst without cooling back to the bottom portion of said regeneration zone, and passing the remainder of the separated hot regenerated catalyst in admixture with additional hydrocarbon gas oil to said conversion zone.

2. In a process for converting a hydrocarbon gas oil to lower boiling products in the presence of a finely divided catalyst having a size range of about 0–200 microns wherein it is desirable to add fresh catalyst to the inventory of catalyst in the process in order to maintain the catalytic effectiveness of said catalyst inventory, the improvement in accordance with which said catalyst inventory in said process is held at a fraction of that necessary for conventional dense fluid bed operation to thereby effect a high replacement rate of said catalyst inventory when adding said fresh catalyst thereto, which comprises passing a mixture of said hydrocarbon gas oil in the vaporous form and hot catalyst containing about 4–8 lbs. of catalyst/lb. of oil upwards at a superficial velocity of about 6–14 ft./sec. through a conversion zone wherein the weight of said hydrocarbon gas oil passing through said conversion zone/hour/weight of catalyst inventory in said conversion zone is maintained at about 15–25 and wherein the vaporous hydrocarbon gas oil is converted to vaporous lower boiling products and a small amount of coke which is deposited on said catalyst to form spent catalyst, separating the vaporous lower boiling converted products from said spent catalyst, recovering the separated vaporous lower boiling converted products, mixing the separated spent catalyst with air and introducing the resultant mixture into the bottom portion of a regeneration zone, passing the resultant mixture concurrently upwards at a superficial velocity of about 6–14 ft./sec. through said regeneration zone wherein about 40–50 lbs. of coke are burned off said spent catalyst/hr/lb. of carbon holdup in said regeneration zone to produce hot regenerated catalyst and gaseous combustion products, separating said hot regenerated catalyst from said gaseous combustion products, recycling the major portion of the separated hot regenerated catalyst without cooling to said regeneration zone, and passing the remainder of the separated hot regenerated catalyst in admixture with additional hydrocarbon gas oil to said conversion zone.

3. An apparatus adapted for converting high boiling hydrocarbons to lower boiling hydrocarbons in the presence of finely divided solid catalyst which includes a tall vertically arranged cylindrical conversion vessel, an inlet line for introducing catalyst particles and hydrocarbon oil into the bottom of said conversion vessel, means for separating spent catalyst particles from converted vaporous hydrocarbons leaving the top of said conversion vessel, a tall vertically arranged cylindrical regeneration vessel of a larger diameter than said conversion vessel, means for mixing the separated spent catalyst with air and introducing the resulting mixture into the bottom of said regeneration vessel, means for separating hot regenerated catalyst from combustion gases leaving the top of said regeneration zone, a hopper for receiving regenerated catalyst, a pipe communicating with said means for separating regenerated catalyst and said hopper for conducting regenerated catalyst to said regenerated catalyst hopper, conduit means communicating with the bottom portion of said hopper for passing one portion of regenerated catalyst to said inlet line for said conversion vessel, a conduit of larger diameter than said conduit means and leading from the interior of said hopper directly to the bottom of said regeneration vessel for recycling a major portion of said regenerated catalyst to said regeneration zone, said conduit means communicating with and opening into the bottom of said hopper for withdrawing regenerated catalyst from the bottom of said hopper and said conduit extending upwardly into said hopper and being provided with a well at its upper end within said hopper, said well being open at its upper end which is positioned intermediate the top portion and bottom portion of said hopper.

4. In a process for cracking a hydrocarbon gas oil to lower boiling hydrocarbons in the presence of a finely divided catalyst having particles in the size range of about 0–200 microns wherein it is desirable to remove used catalyst and to add fresh catalyst to the inventory of catalyst in the process in order to maintain the catalytic effectiveness of said catalyst inventory at a desired high level, the improvement which comprises selecting said catalyst inventory in said process to be only a fraction of the inventory necessary for conventional dense fluid bed operation so that adding the same amount of fresh catalyst as replacement catalyst to said smaller catalyst inventory as to said larger conventional fluid bed catalyst inventory results in a high replacement rate of said catalyst inventory and will result in a higher catalyst activity level in said smaller catalyst inventory, passing a mixture of vaporous hydrocarbon gas oil and hot catalyst containing at least about 4 lbs. of catalyst/lb. of oil upwards at a superficial velocity of at least about 6 ft./sec. through a tubular vertical cracking zone wherein the weight of said hydrocarbon gas oil passing through said cracking zone/hour/weight of catalyst in said cracking zone is maintained at at least about 15 and wherein the vaporous hydrocarbon gas oil is cracked to vaporous lower boiling hydrocarbons and a small amount of coke which is deposited on said catalyst to form spent catalyst, separating the vaporous lower boiling cracked hydrocarbons from said spent catalyst, recovering the separated vaporous lower boiling hydrocarbons, mixing the separated spent catalyst with air, and introducing the resultant mixture into the bottom portion of a tubular vertical regeneration zone, passing the resultant mixture concurrently upwards at a superficial velocity of at least about 6 ft./sec. through said regeneration zone wherein coke is burned off said spent catalyst to produce hot regenerated catalyst and gaseous combustion products, separating said hot regenerated catalyst from said gaseous combustion products, recycling at least 50% of the separated hot regenerated catalyst without cooling back to the bottom part of said regeneration zone, and passing the remainder of the separated hot regenerated catalyst in admixture with additional hydrocarbon gas oil to the bottom portion of said cracking zone.

References Cited in the file of this patent
UNITED STATES PATENTS

| | | |
|---|---|---|
| 2,253,486 | Belchetz | Aug. 19, 1941 |
| 2,374,660 | Belchetz | May 1, 1945 |
| 2,377,935 | Gunness | June 12, 1945 |
| 2,379,711 | Hemminger | July 3, 1945 |
| 2,396,109 | Martin | Mar. 5, 1946 |
| 2,397,352 | Hemminger | Mar. 26, 1946 |
| 2,417,275 | Thompson | Mar. 11, 1947 |
| 2,696,461 | Howard | Dec. 7, 1954 |
| 2,718,491 | Green | Sept. 20, 1955 |
| 2,731,508 | Jahnig | Jan. 17, 1956 |
| 2,735,822 | Campbell | Feb. 21, 1956 |

UNITED STATES PATENT OFFICE
CERTIFICATE OF CORRECTION

September 1, 1959

Patent No. 2,902,432

Howard G. Codet, et al

It is hereby certified that error appears in the printed specification of the above numbered patent requiring correction and that the said Letters Patent should read as corrected below.

Column 11, line 75, for "0-0200 microns" read -- 0-200 microns --.

Signed and sealed this 22nd day of March 1960.

(SEAL)
Attest:

KARL H. AXLINE
Attesting Officer

ROBERT C. WATSON
Commissioner of Patents